March 26, 1940.    E. F. CHRISTENSEN    2,195,296
ELECTRIC TRANSLATING SYSTEM
Filed Oct. 18, 1938
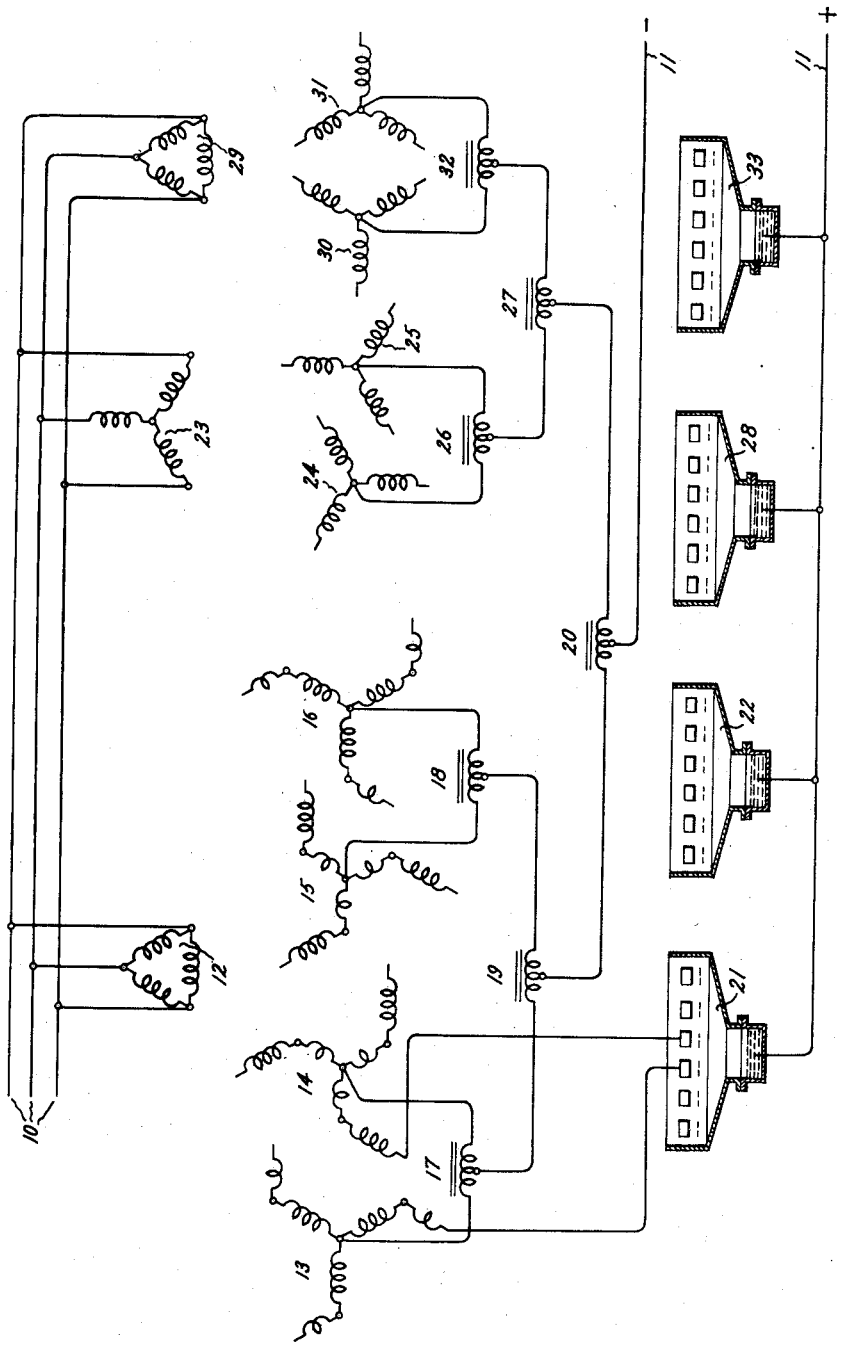
Inventor:
Everett F. Christensen,
by Harry E. Dunham
His Attorney.

Patented Mar. 26, 1940

2,195,296

UNITED STATES PATENT OFFICE 2,195,296

ELECTRIC TRANSLATING SYSTEM

Everett F. Christensen, Pittsfield, Mass., assignor to General Electric Company, a corporation of New York Application October 18, 1938, Serial No. 235,623

5 Claims. (Cl. 175—363)

My invention relates to electric translating systems and more particularly to such systems including transforming apparatus for transmitting energy between a pair of electric translating circuits, the transforming apparatus being provided with a winding system comprising multiple polyphase networks operating in parallel. While my invention is of general application, it is particularly suitable for transmitting energy between a polyphase alternating current circuit and a direct current circuit through an electric valve converting apparatus.

It is well known in the art that, when transmitting energy from an alternating current supply circuit to a direct current load circuit through an electric valve converting apparatus, the voltage regulation of the system and the wave form of both the alternating and direct current circuits are improved and the inductive interference decreased by increasing the equivalent number of phases of the secondary windings of the transformer in any of several well known manners. Up to the present time it has been economically feasible to provide electric translating systems up to twelve phases but it has not heretofore been economical to increase the number of phases beyond this. In order to secure a good utilization of the electric valve converting apparatus it is desirable to have several anodes effective simultaneously and thus the secondary windings of the transformers must be arranged through midtap-reactors known as interphase transformers to cause the desired parallel operation. In providing such arrangement utilizing multiple polyphase networks it has been found desirable to cause the leakage reactances of the component elements of each phase of said networks to be so proportioned that when the networks are carrying current in proportion to their ratings, their resultant counter-electromotive forces will have the same vectorial relation to their respective terminal voltages. Furthermore, it has been found necessary to prevent unbalance between the multiple secondary networks which may be occasioned by inequalities in the line-to-neutral impedances of the several phases of the multiple secondary networks. Furthermore, it is necessary to prevent any substantial unbalance in load between the multiple secondary networks so as to prevent the lowering of the efficiency of the apparatus which decreases its rating, and when used in connection with electric valve converting apparatus increases the susceptibility to arc backs and other disturbances in the system.

It is an object of my invention therefore, to provide an improved electric translating system for transmitting energy between a pair of electric translating circuits by means of transforming apparatus having winding systems comprising multiple polyphase networks operating in parallel, and which will overcome the above-mentioned disadvantages in arrangements of the prior art, and which will be simple, reliable and economical in operation.

It is still another object of my invention to provide an improved electric translating system for transmitting energy between a pair of electric translating circuits by means of transforming apparatus having a winding system comprising a plurality of multiple polyphase networks of a greater number than possible heretofore, by means of which an equal division of load between the multiple secondary networks may be insured.

In accordance with my invention a pair of electric translating circuits, one of which is a polyphase alternating current circuit, are interconnected through transforming apparatus including a plurality of primary and secondary winding systems, one of the winding systems being a polyphase network connected to the polyphase circuit and associated with a group of multiple polyphase networks operating in parallel. An equal division of the load between the multiple secondary networks of this group is secured by so proportioning the coupling between the several windings of the multiple networks and the leakage reactances of the individual windings so that when the networks are carrying current in proportion to their ratings, their resultant counter-electromotive forces will have the same vectorial relation relative to their respective terminal voltages. In order to provide still additional phases, a plurality of polyphase secondary networks each energized by a single polyphase network of different connections which are energized from the same polyphase circuits, are employed together with means for causing parallel operation of all of these two groups of multiple polyphase networks and by having the voltage component supplied by these secondary windings of the polyphase networks displaced in phase from each other and from the voltage components produced by the first mentioned groups of polyphase secondary windings. Since it has been found economically impractical and physically extremely difficult to produce a second transformer arrangement corresponding to the first mentioned transformer and yet having the required phase difference therefrom, it has been found advisable to provide these additional phases for multiple operation, such as twenty-four phase operation, by utilizing two additional groups of polyphase networks.

For a better understanding of my invention, together with other and further objects thereof, reference is had to the following description taken in connection with the accompanying drawing in which the single figure illustrates an embodiment of my invention, and its scope will be pointed out in the appended claims.

Referring now to the single figure of the drawing there is illustrated a system embodying my invention for transmitting energy from a polyphase alternating current circuit 10 having three phases to a direct current load circuit 11. The system includes a transforming apparatus consisting of a three-phase primary network 12, which may be Y-connected or delta connected as shown, connected to the alternating current supply circuit 10 and four three-phase zigzag secondary networks 13, 14, 15 and 16. Each phase of the secondary networks comprises a main winding, either a short or a long coil, inductively related to one of the primary phases. In networks 13 and 16 the main coil is a long coil while in networks 14 and 15 the main coil is a short coil. The networks 13 and 16 have connected in series with each long coil, an auxiliary short coil. In network 16 the auxiliary short coil is energized from the next preceding primary phase but reversed in polarity so as to be advanced in phase with respect to its long coil. This network is said to be forward zigzagged. On the other hand network 13 has its auxiliary or short coils energized from the next succeeding primary phase also reversed in polarity so as to retard the phase of the resultant voltage. This network is said to be backward zigzagged, that is, it is zigzagged oppositely to the network 16. Similarly network 14 is forwardly zigzagged in a manner just like network 16 except that the long and short coils are interchanged, while network 15 is backwardly zigzagged similar to network 13 except that the long and short coils of the respective phases are interchanged. This arrangement of the polyphase secondary networks 13 to 16 may be referred to as a quadruple zigzag connection. Certain coils of the several networks 13 to 16, inclusive, are so proportioned that the voltages of the terminals of the windings thereof are displaced in phase by 30 electrical degrees. The neutral points of the secondary networks 13 and 14 are interconnected by an inductive winding or interphase transformer 17, the midpoint of which is connected through a portion of another inductive winding 19 and a second inductive winding 20 to one side of the direct current circuit 11. Similarly, the inductive networks 15 and 16 are interconnected by the inductive network 18 the midpoint of which is connected through portions of the inductive windings 19 and 20 to one side of the direct current circuit 11. Each of the outer extremities of the polyphase networks 13, 14, 15 and 16 is connected to one of the anodes of the electric discharge devices 21 and 22 the cathodes of which are connected to the other side of the direct current circuit 11. The terminal voltages of the polyphase secondary networks 13 to 16 are so displaced that without the use of the interphase transformers 17, 18 and 19 twelve-phase operation would result. By the use of the interphase transformers four anodes of the mercury arc discharge devices 21 and 22 are simultaneously conductive, each conducting current for 120 electrical degrees of each cycle, the several networks 13 to 16 thus operating in parallel to supply current to the direct current circuit 11. The manner in which this translating device comprising the primary winding 12 and the secondary windings 13 to 16 is constructed is described in greater detail in United States Letters Patent No. 1,895,370, granted January 24, 1933, upon the application of Aram Boyjian and in United States Letters Patent No. 2,009,166, granted July 23, 1935, upon the application of Earl V. DeBlieux.

In order to provide twelve additional phases by an economical means which will produce the desired operation and which will not introduce any unbalance this is accomplished by utilizing two groups of polphase secondary networks each energized from a primary network connected to the alternating current supply circuit 10. Thus, one primary network 23 is Y-connected to the alternating current supply circuit 10 and is provided with two three-phase secondary networks 24 and 25 each having single windings associated with the individual phases of the transformer network 23. The neutral points of the secondary networks 24 and 25 are interconnected by means of an interphase transformer 26 the midpoint of which is connected through a portion of the interphase transformer 27 and a portion of the interphase transformer 20 to one side of the direct current circuit 11. Each of the outer extremities of the secondary networks 24 and 25 is connected to one of the corresponding anodes of an electric valve converting device 28, the cathode of which is connected to one side of the direct current circuit 11. The second group of inductive networks comprises a delta-connected primary winding 29 and a plurality of star-connected secondary networks 30 and 31 the neutral points of which are interconnected by an interphase winding 32. The midpoint of the interphase winding 32 is connected through a portion of the interphase transformer 27 and a portion of the interphase transformer 20 to one side of the direct current circuit 11. The outer terminals of the secondary networks 30 and 31 are each connected to the respective anodes of an electric discharge device 33. Since the one primary network 23 is star-connected and the other primary network 29 is delta-connected it will be apparent to those skilled in the art that the resultant operation will be twelve-phased and this connection of the primary network produces the desired 30 degree difference in phase between the terminal voltages of the two groups of secondary networks. The four Y-connected secondary networks 24, 25, 30 and 31 are said to be connected in quadruple Y. In this manner then an additional twelve-phase network is obtained, the terminal voltages of which differ in phase from the terminal voltages of the first group of secondary windings 13 to 16.

While each of the electric valves 21, 22, 28 and 33 have been shown as comprising a plurality of anodes each provided with control electrodes or grids all contained within an envelope having a single cathode, it of course, will be understood that a plurality of individual devices or still other arrangements of electric valve converting apparatus may be utilized, although it is preferable to utilize electric valve converting apparatus of a type having an anode and a cathode enclosed within an envelope containing an ionizable medium. The use of control grids of course will facilitate the regulation of the voltage output appearing across the direct current circuit 11 but it is to be understood that the use of control grids or ignitor control electrodes is not essential to the operation of this system.

Since the general principles of operation of the above described electric valve converting apparatus will be well understood by those skilled in the art, no detailed operation thereof will be given. By the use of the various interphase transformers which have considerable reactance, the transfer of current between the terminals associated with the different networks may be minimized to any desired extent so that the current will commute only between those terminals associated with the same networks. Under these conditions each anode of the electric valve converting apparatus 21, 22, 28 and 33 will be connected simultaneously, each anode conducting current for 120 electrical degrees at each cycle and the several networks 13, 14, 15, 16, 24, 25, 30 and 31 will operate in parallel to supply current to the direct current circuit 11. Since the reactances of the transformers are so designed the impedance drop in each phase of the several multiple windings are equal and have the same phase relation to their respective number of voltages, the load current divides equally between the multiple windings.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric translating system comprising a pair of electric translating circuits, one of which is a polyphase alternating current circuit, transforming means interconnecting said circuits and including primary and secondary winding systems, one of said secondary winding systems comprising multiple polyphase networks operating in parallel and being associated with a primary polyphase network connected to said polyphase circuit, each phase of certain of said multiple networks comprising winding elements inductively related to a plurality of phases of said primary network, and being displaced in phase by an angle different than that between any component elements of the phases of certain other of said multiple networks, the remainder of said secondary winding systems comprising multiple polyphase networks operating in parallel and being associated with two differently arranged primary polyphase networks each connected to said polyphase circuit, each phase of said multiple networks comprising a single winding element inductively related to a single phase of one of said primary networks, said secondary winding elements being displaced in phase from each other by equal amounts each less than the displacement between the phases of said polyphase alternating current circuit.

2. The combination in an electric valve converting system comprising a polyphase alternating current supply circuit, a direct current load circuit, a plurality of electric valves associated with said load circuit, and transforming means interconnecting said valves and said supply circuit and including primary and secondary winding systems, one of said primary winding systems comprising a polyphase member connected to said polyphase circuit and having associated therewith four groups of polyphase networks each phase of which comprises winding elements inductively related to a plurality of phases of said primary network and being displaced in phase by an angle different than that between any component elements of the phases of certain other of said secondary networks, a delta-connected primary network having two star-connected secondary networks, a star-connected primary network having two star-connected secondary networks, said delta-connected and said star-connected primary networks being connected to said polyphase circuit, and means for causing the parallel operation of the secondary network of said last mentioned primary winding system, said last mentioned secondary winding system operating to produce voltage components differing in phase from the voltage components supplied by said first mentioned multiple polyphase secondary network, and means for causing all of said secondary networks to operate in parallel to supply energy to said electric valve converting means.

3. An electric translating system comprising a pair of electric translating circuits, one of which is a polyphase alternating current circuit, transforming means interconnecting said circuits and including primary and secondary winding systems, one of said secondary winding systems comprising a twelve-phase polyphase network including a plurality of sections operating in parallel with one another and being associated with a primary polyphase network connected to said polyphase circuit, each phase of said polyphase network comprising winding elements inductively related to a plurality of phases of said primary network, and being displaced in phase by an angle different than that between any component elements of the phases of certain other of said multiple networks, the remainder of said secondary winding systems being divided into two groups of polyphase networks all operating in parallel to provide twelve-phase operation differing in phase from the twelve-phase operation of said first-mentioned polyphase network, each of said groups of secondary windings being associated with a single primary polyphase network connected to said polyphase circuit, said single primary polyphase networks being arranged differently from each other, and each phase of said groups of multiple networks comprising a single winding element inductively related to a single phase of one of said primary networks, and means for causing the parallel operation of all of said secondary winding systems.

4. An electric translating system comprising a pair of electric translating circuits, one of said circuits being a polyphase alternating current circuit, transforming means interconnecting said circuits and including primary and secondary winding systems, one of said secondary winding systems comprising multiple polyphase networks operating in parallel and being energized from a polyphase network connected to said polyphase circuit, each phase of certain of said multiple networks comprising winding elements inductively related to a plurality of the phases of said primary network, said winding elements being displaced in phase by an angle different than that between any component element of the phases of said other of said multiple networks, the leakage reactances of the component elements of each phase of said multiple networks being so proportioned that, when said networks are carrying current in proportion to their ratings, their resultant counter-electromotive forces will have the same vectorial relations to their respective terminal voltages, the remainder of said secondary winding systems comprising two groups of multiple polyphase networks each associated with one of two differently arranged single primary polyphase networks connected to said polyphase circuit, each phase of said latter multiple networks comprising a single winding element inductively related to a single phase of one of said primary networks, said secondary winding elements being displaced in phase from each other by equal amount each less than the displacement between the phases of said polyphase alternating current circuits, means for causing said two groups of polyphase secondary networks to operate in parallel, and means for causing all of said multiple polyphase secondary networks to operate in parallel.

5. In an electric valve converting system, a polyphase alternating current supply circuit, a direct current load circuit, a plurality of electric valves associated with said load circuit, translating means for interconnecting said electric valves and said supply circuit comprising a plurality of parallel connected transformers each provided with a primary winding connected to a supply circuit, one of said primary windings having associated therewith four groups of polyphase secondary networks connected in quadruple zigzag and inductively related to the plurality of phases of said primary winding, the second set of four groups of polyphase secondary networks connected in quadruple wye and inductively related with a pair of primary windings one connected in wye and the other in delta so that said last mentioned secondary networks operate to produce voltage components differing in phase from the voltage components supplied by said quadruple zigzagged secondary network, and means for causing parallel operation of all of said secondary networks.

EVERETT F. CHRISTENSEN.